United States Patent
Thirumalai et al.

(10) Patent No.: US 7,324,863 B2
(45) Date of Patent: Jan. 29, 2008

(54) AUTOMATICALLY SELECTING WAFERS FOR REVIEW

(75) Inventors: Paul P. Thirumalai, Hillsboro, OR (US); Rick Mayer, Aloha, OR (US); Mike J. Wodarczyk, Vancouver, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/394,286

(22) Filed: Mar. 30, 2006

(65) Prior Publication Data

US 2007/0239306 A1    Oct. 11, 2007

(51) Int. Cl.
*G06F 19/00* (2006.01)
(52) U.S. Cl. .................. 700/110; 700/121; 702/35; 702/181; 716/4; 716/19; 438/16
(58) Field of Classification Search ........ 700/108–110, 700/121; 702/35, 181; 716/4, 19; 438/16, 438/17
See application file for complete search history.

(56) References Cited

U.S. PATENT DOCUMENTS

| | | | |
|---|---|---|---|
| 6,477,685 B1 * | 11/2002 | Lovelace | 716/4 |
| 6,701,259 B2 * | 3/2004 | Dor et al. | 702/35 |
| 6,985,830 B2 * | 1/2006 | Lee et al. | 702/181 |
| 7,103,505 B2 * | 9/2006 | Teshima et al. | 702/183 |
| 2003/0120459 A1 * | 6/2003 | Lee et al. | 702/181 |
| 2003/0135295 A1 * | 7/2003 | Dor et al. | 700/108 |

* cited by examiner

*Primary Examiner*—Kidest Bahta
*Assistant Examiner*—Douglas S Lee
(74) *Attorney, Agent, or Firm*—Trop, Pruner & Hu, P.C.

(57) ABSTRACT

In one embodiment, the present invention includes a method for receiving a set of inspection files each corresponding to an inspection performed on a wafer of a set of wafers, automatically analyzing the set of inspection files to select at least one inspection file corresponding to a predetermined rule set, and identifying the wafer(s) associated with the selected inspection file(s). Other embodiments are described and claimed.

17 Claims, 2 Drawing Sheets

AUTOMATICALLY SELECTING WAFERS FOR REVIEW

BACKGROUND

Embodiments of the present invention relate to semiconductor processing, and more particularly to analyzing wafers for defects or other deviations.

Semiconductor devices are manufactured in a fabrication facility (fab) by executing a number of processes on lots of wafers running through various tools and equipment of the fab. These various tools and equipment are used to perform depositions, photolithography, implantations, and metallizations among many other steps in forming semiconductor devices. Because of the small size associated with advanced technology nodes, even very small defects on a wafer can cause a failure of a die (i.e., corresponding to a semiconductor device) of the wafer.

Various engineers and others involved in the semiconductor manufacturing process are interested in improving yields associated with semiconductor manufacture, and various efforts are put forth to increase the number of dies on a wafer that are defect free. To this end, various tools are available to perform inspection and review of wafers during the manufacturing process. For example, an inspection tool may be used to perform various inspections of the wafers of a wafer lot to identify defects present after a given manufacturing step. In some fabs, some or all wafers of a wafer lot are inspected in an inspection tool at the conclusion of one or more manufacturing steps. In some cases, one or more of the inspected wafers may then be provided to a review tool for further review, e.g., by way of imaging to obtain image data that can later be analyzed by an engineer. Often, a random selection of wafers for review in a review tool is performed.

Historically, the number of wafers that are inspected for defects is greater than the number of wafers that are reviewed. Due to this arrangement, there may be a loss of learning, as some of the wafers that were not reviewed may contain defect patterns of interest for yield learning purposes. If an interesting defect pattern is appearing in wafer lots, an engineer may specify that one or more wafers having a certain number of defects should be reviewed in a review tool. Accordingly, a technician or other fab employee must manually parse the inspection data to identify such wafers and provide them to the review tool, which is a time-consuming process.

Furthermore, it may often occur that after a wafer is inspected and reviewed a defect reduction engineer or other fab employee may find an interesting defect pattern on one or more wafers that were inspected in the inspection tool but not reviewed. Because by the time of this analysis, the wafer lot may have passed along to further operations in the fab, the engineer may not be able to send the lot back to the review tool to improve yield learning by capturing review tool information regarding the defects. Accordingly, a potentially valuable source of information to attempt to resolve a root cause of defects is lost, and one or more additional lots may be exposed to the defect issue.

DETAILED DESCRIPTION

Figure 1:
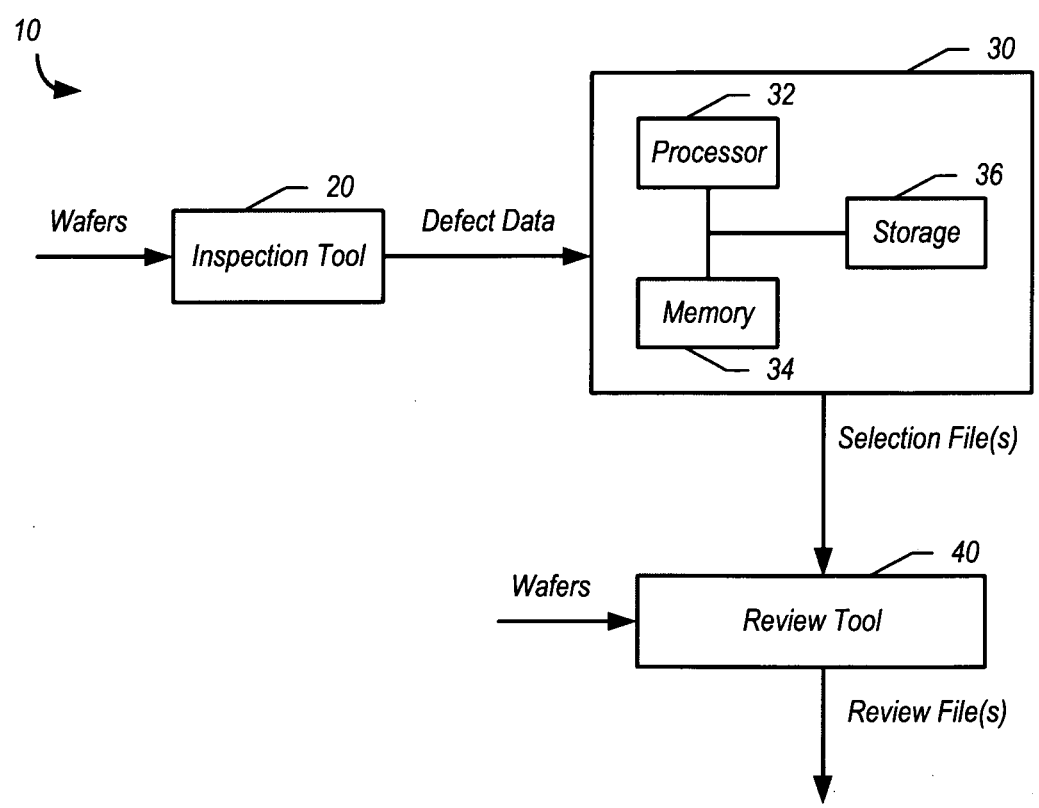
FIG. 1 is a block diagram of a system in accordance with one embodiment of the present invention.

Referring now to FIG. 1, shown is a block diagram of a system in accordance with one embodiment of the present invention. System 10 may be located in a semiconductor fabrication facility. More particularly, at least portions of system 10 may be located in a clean room of the fab. As shown in FIG. 1, system 10 includes various tools that are used to perform wafer analysis in accordance with an embodiment of the present invention. As shown in FIG. 1, system 10 includes an inspection tool 20, which may be configured to receive incoming wafers, e.g., as a wafer boat or other wafer lot. Inspection tool 20 may perform various inspection activities with respect to each wafer of a lot. For example, inspection tool 20 may perform testing or other activities to determine a defect pattern associated with each wafer of the lot. In some embodiments, all wafers may be inspected, while in other embodiments a predetermined number of wafers of a lot may be inspected. The identified defects may be marked and further may be stored as coordinate data to identify defect location with respect to its associated wafer in a file generated in inspection tool 20. The identified defects may be stored as a wafer map, for example. Additional information may be obtained for each wafer inspected, such as number of defects, size of defects, and so forth. Each wafer of a lot may have such a file generated for it.

Upon completion of inspection operations in inspection tool 20, the wafer lot may be removed, and defect data, e.g., a defect file for each wafer of the lot may be provided to a computer system 30. In various embodiments, computer system 30 may be a processor-based system, such as a personal computer (PC), server computer or other such system. As shown in the embodiment of FIG. 1, computer system 30 includes various components including a processor 32, a memory 34 which may be a dynamic random access memory (DRAM) in various embodiments, and a storage 36, which may be a mass storage device, such as a hard disk drive or other non-volatile memory. Of course, computer system 30 may include many other components and functionality, however, these basic elements are shown in FIG. 1 for ease of illustration.

In accordance with various embodiments of the present invention, computer system 30 may include various yield analysis applications to be performed on data associated with wafers. These applications may be stored in storage 36 and provided as needed to memory 34, which is then accessed by processor 32 to execute the applications. As an example, the applications may include a yield analysis application that receives and processes data obtained from inspection tool 20. Such an application may determine a yield value for a given wafer, i.e., a number corresponding to the amount of individual die of the wafer that do not suffer from defects. Other yield analysis applications may perform further analysis of the data.

Still further, in accordance with various embodiments a wafer picker application also present in computer system 30 may be executed for a set of data files corresponding to a wafer lot. The wafer picker application may be used to select one or more wafers from the lot for further review. In accordance with various embodiments, the wafer picker application may analyze the defect data for each wafer and, based upon a set of one or more predetermined rules, select or identify one or more such wafers for further analysis, e.g., in a review tool. The predetermined rules, which may be one or more rules determined by a user, such as a process engineer, yield enhancement engineer, or the like, may select the one or more wafers based on various criteria. For example, in some embodiments criteria used for selection may include one or more of the following: identification based on a wafer identifier (ID); identification based on wafer location in a boat; identification based on defect count or defect count filtered by defect characteristics; and so forth.

In some implementations, the wafer picker application may thus perform filtering to identify one or more wafers by treating each wafer as a set of defects based on the defect data obtained from inspection tool 20. The wafer picker application may then create a subset of defects based on one or more defect filters set forth in the predetermined rules. Furthermore, the wafer picker application may select one or more wafers based on its location, e.g., a slot ID corresponding to location of a wafer in a lot. The wafer picker application may store an identification of the selected wafers in a file that includes information regarding the wafer, e.g., wafer ID and slot ID of the selected one or more wafers. This selection or identification file may be stored in storage 36, for example.

Still referring to FIG. 1, next this identification file may be sent from computer system 30 to a review tool 40. Review tool 40 may receive the wafer lot, e.g., sometime after inspection of the wafers in inspection tool 20. Based on the data provided in the identification file, review tool 40 may be used to perform various review operations on the one or more wafers of a given lot selected for further review. Review operations performed in review tool 40 may include obtaining of image data regarding the wafer(s) selected. Such image data may later be analyzed by an engineer for analysis, e.g., in determining a source of a given type of defect or for other purposes. Note that the review files generated in review tool 40 may be provided to various locations. For example, in some embodiments the review files may be stored in review tool 40, when a such a tool has a display or other user interface associated with it. Alternately, the review files may be sent back to computer system 30, or to another location such as a PC or server computer that can later be accessed by an engineer for analysis of the review files. While described with this particular implementation in the embodiment of FIG. 1, it is to be understood that the scope of the present invention is not limited in this regard. Note that from review tool 40 wafers of a wafer lot (including the selected wafers) may be provided to additional tools of a fabrication facility for further processing, e.g., formation of multiple layers and devices thereon. Further it is to be understood that in the process of manufacturing semiconductor devices, the unfinished wafers may pass through system 10 a number of times (e.g., after formation of each layer of the device or multiple such layers).

Figure 2:
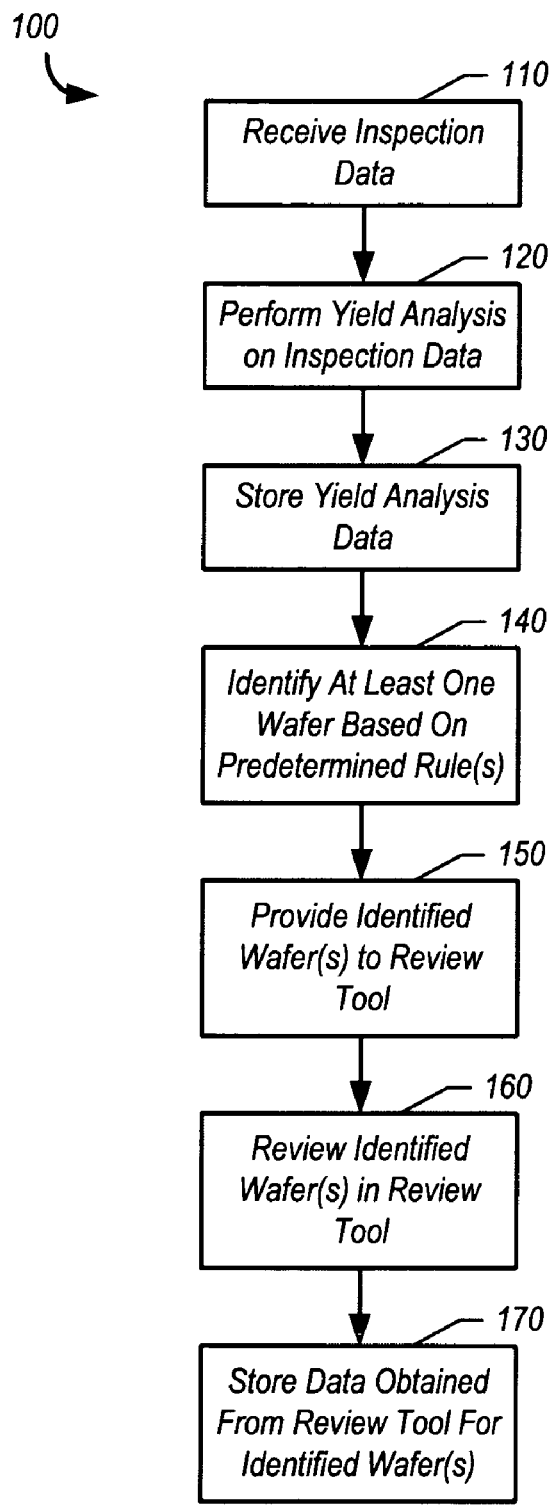
FIG. 2 is a flow diagram of a method in accordance with one embodiment of the present invention.

Referring now to FIG. 2, shown is a flow diagram of a method in accordance with one embodiment of the present invention. As shown in FIG. 2, method 100 may be performed to select one or more wafers for further analysis, e.g., in a review tool. In some embodiments, method 100 may correspond, in part, to a wafer picker application that may be executed using defect data obtained from a wafer lot undergoing fabrication.

Method 100 may begin by receiving inspection data (block 110). For example, inspection data which may correspond to defect data for each wafer of a lot may be received in a PC from an associated inspection tool. Then, various yield analysis activities may be performed on the inspection data (block 120). As an example, yield analysis information may be obtained for the wafer, e.g., as the percentage of valid die on the wafer. Next, the yield analysis data may be stored (block 130). For example, the yield analysis data may be stored in a hard drive or other storage of the PC. Such yield analysis data may further include pattern recognition analysis which assigns a pattern number and a pattern type specification for each defect, which also may be stored.

Next, one or more wafers may be identified based on one or more predetermined rules (block 140). That is, based on a rule set, which may be developed by a user, one or more of the wafers of a given lot may be selected for further review, e.g., in a review tool. Note that the rule set includes one or more rules to be applied to the information provided to a system that performs the wafer identification. The rules of a rule set may include combinations of criteria. For example, one or more wafers of a lot may be selected based on a wafer ID or slot ID, while one or more other wafers may be selected based on defect pattern information. For example, a single wafer with the highest number of defects may be selected, in one embodiment. As another example, one or more wafers having a defect pattern that matches criteria in the rule set may be selected. These criteria may be, for example, defects in a given location in a wafer, e.g., near a notch of a wafer. Alternately, one or more wafers having a certain number of defects (e.g., greater than a threshold number) and further where at least some number of the defects are greater than a given defect size (e.g., corresponding to a size threshold) may be selected. Thus for example, one or more wafers may be selected based on wafer location selections, followed by defect count criterion.

In some embodiments, such selection may be performed by a wafer picker application in accordance with an embodiment of the present invention. Accordingly, such selection may be performed automatically and in real time, avoiding the need for manual intervention and furthermore reducing the amount of time required for such selection. In this way, an improved rate of data collection may be realized and furthermore yield learning may be enhanced by reducing the amount of manual intervention. As a result, the reduction in time between a defect pattern's first detection at inspection and an engineer determining a root cause of the source of the defect may reduce a number of lots exposed to the defect issue, in various embodiments.

The wafer picker application may directly use the defect data obtained from an inspection tool to select wafers. In other implementations, the wafer picker application may use the yield analysis data. In still further embodiments, a combination of such data may be used. In any event, the wafer picker application may select the one or more wafers for further analysis. Further, the wafer picker application may store a file that includes information regarding the selected wafers. As an example, such a file may include identification information for each wafer, e.g., corresponding to a wafer ID and/or a slot ID or other such identifying information.

Still referring to FIG. 2, the identified wafers may be provided to a review tool (block 150). In various implementations, an entire wafer lot may be provided to the review tool, along with input information to enable the review tool to identify the wafer(s) selected for further analysis. The review tool may be controlled, e.g., by a station controller that receives the input information, which may correspond to an output file provided by the wafer picker application. This output file includes information regarding the wafer(s) selected for review. Accordingly, based on this file, the station controller or other controller of the review tool may cause review of the selected wafers. In other embodiments, only those selected wafers as determined by the wafer picker application, are provided to the review tool.

In turn, the review tool may be used to perform various review operations for the identified wafers (block 160). For example, the review tool may include an image capture device to obtain, e.g., digital images of the wafer. These digital images may be stored in image files. Accordingly, the data obtained from the review tool, which may include spectrum analysis data regarding elemental makeup of defects, defect size information and the like, in addition to image data may be stored (block 170). Such data may be stored in various locations in different embodiments. For example, the information may be stored in the review tool itself. Alternately, the data may be provided to another location, as desired. While described with this particular implementation in the embodiment of FIG. 2, it is to be understood that the present invention is not limited in this regard.

Accordingly, in various embodiments a rules-based wafer selection may be performed. This wafer selection may be automatically performed, reducing manual intervention and improving data collection rates. Furthermore, the automatic selection may identify one or more wafers of a wafer lot with interesting defect characteristics for further review.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving a set of inspection files, each of the set of inspection files corresponding to an inspection performed on a wafer of a set of wafers;
   automatically analyzing the set of inspection files to select at least one inspection file based on an aggregated defect count; and
   identifying the at least one wafer associated with the selected at least one inspection file.

2. The method of claim 1, further comprising:
   generating a selection file associated with the selected at least one inspection file; and
   routing the selection file to a review tool.

3. The method of claim 2, further comprising reviewing the at least one wafer in the review tool based on the selection file.

4. The method of claim 1, further comprising inspecting the set of wafers for defect patterns and storing the defect patterns in the set of inspection files.

5. The method of claim 1, wherein automatically analyzing the set of inspection files comprises filtering the set of inspection files based on the predetermined rule set.

6. A system comprising:
   a processor to perform instructions;
   a storage coupled to the processor including instructions that when executed by the processor cause the system to automatically select at least one wafer from a wafer lot for review, wherein the at least one wafer is selected based on a defect pattern of the at least one wafer in a pre-selected region of the at least one wafer; and
   a dynamic random access memory (DRAM) coupled to the processor.

7. The system of claim 6, further comprising instructions to select the at least one wafer based on a rules-based analysis.

8. The system of claim 6, further comprising instructions to identify a subset of defects of the defect pattern.

9. The system of claim 6, further comprising instructions to provide a file associated with the at least one wafer to a review tool.

10. The system of claim 7, wherein the rules-based analysis is based on user input.

11. The system of claim 10, wherein the user input comprises selection based on a wafer identifier or a wafer slot location.

12. The system of claim 11, wherein the user input further comprises selection based on a defect count filtered by defect characteristics.

13. The system of claim 6, further comprising instructions to select the at least one wafer from an input file for each wafer of the wafer lot.

14. The system of claim 6, further comprising instructions to generate a review tool input file for the at least one wafer, wherein the review tool input file includes a wafer identifier and a wafer slot indicator for the at least one wafer.

15. An article comprising a machine-accessible medium including instructions that when executed cause a system to:
   receive a set of inspection files, each of the set of inspection files corresponding to an inspection performed on a wafer of a set of wafers;
   analyze the set of inspection files to select at least one inspection file corresponding based on a defect pattern in a predetermined region of the associated wafer; and
   identify the at least one wafer associated with the selected at least one inspection file.

16. The article of claim 15, further comprising instructions that when executed cause the system to:
   generate a selection file associated with the selected at least one inspection file; and
   route the selection file to a review tool.

17. The article of claim 15, further comprising instructions that when executed cause the system to filter the set of inspection files based on the at least one predetermined rule.

* * * * *